United States Patent
Roy

(10) Patent No.: US 11,805,938 B2
(45) Date of Patent: Nov. 7, 2023

(54) BEVERAGE HEATER

(71) Applicant: Sanjay K Roy, Miami, FL (US)

(72) Inventor: Sanjay K Roy, Miami, FL (US)

( * ) Notice: Subject to any disclaimer, the term of this patent is extended or adjusted under 35 U.S.C. 154(b) by 519 days.

(21) Appl. No.: 17/159,424

(22) Filed: Jan. 27, 2021

(65) Prior Publication Data

US 2021/0244232 A1 Aug. 12, 2021

Related U.S. Application Data

(60) Provisional application No. 62/972,146, filed on Feb. 10, 2020.

(51) Int. Cl.
*A47J 36/24* (2006.01)

(52) U.S. Cl.
CPC .................. *A47J 36/2494* (2013.01)

(58) Field of Classification Search
CPC .. A47J 36/2494; B65D 88/74; B65D 81/3476
See application file for complete search history.

(56) References Cited

U.S. PATENT DOCUMENTS

| 5,611,328 A | 3/1997 | McDermott |
| 2016/0007782 A1* | 1/2016 | Chicoine ............ A47G 19/2288 219/438 |
| 2020/0229645 A1* | 7/2020 | Karsten ................. A47J 47/145 |

FOREIGN PATENT DOCUMENTS

WO WO-2012097301 A1 * 7/2012 ........... B28B 11/245

* cited by examiner

*Primary Examiner* — Kun Kai Ma

(57) ABSTRACT

This invention relates to temperature control of hot beverages served in mugs/cups. It is particularly well suited for ensuring that temperatures of hot drinks can be maintained in an optimum/preferred range for long periods of time. It can also be used for heating and/or temperature control of other food items such as soups and gravy, as well as fluids/suspensions/slurries in various consumer, commercial and industrial applications. The invention achieves this by utilizing one or more compact heating blocks that comprises an electrical energy storage module with electric heating, power receiving and recharging circuits that are encapsulated together to permit total immersion in a hot drink. During use, these are be added to a drink to maintain it at a high temperature in a manner similar to ice-cubes that are used with cold drinks. A separate charger is then used to charge/recharge the heating block(s) in a non-contact manner after each use.

16 Claims, 3 Drawing Sheets

10

(i)

(ii)

10

BEVERAGE HEATER

RELATED APPLICATION

This application claims the benefit of U.S. Provisional Appl. Ser. No. 62/972,146 filed on Feb. 10, 2020—the contents of which are incorporated by reference herein.

FIELD OF INVENTION

This invention is related to temperature control of hot beverages such as hot coffee, tea, chocolate, etc. It is specifically designed to ensure that the temperature of hot drinks remain in an optimum range for long periods after they have been served to an individual. It is particularly well suited for use with cups/mugs of beverages such as hot coffee or tea that a person drinks gradually over time. It can also be used for heating and or temperature control of other fluids/suspensions/slurries in consumer, commercial and industrial applications.

BACKGROUND OF THE INVENTION

Hot drinks (e.g. coffee, tea, chocolate) are amongst the most common items consumed on a daily basis around the world. For maximum satisfaction/enjoyment, these drinks must be typically taken at temperatures of about 60±8 C. However, since heat transfer from a mug/cup containing a hot drink to the surroundings (typically at ~25 C) is significant, its temperature can drop quickly. As a result, it is necessary to consume a hot drink in 10-15 minutes or less if one has to ensure that the drink does not get unacceptably cold (i.e. below ~50 C).

DESCRIPTION OF THE PRIOR ART

Heat transfer from hot drinks to the surroundings causes rapid cooling, and resulting "tepid" drinks are not enjoyable/acceptable for most individuals. A number of methods are therefore used to prevent hot drinks becoming too cold before they are fully consumed. They include the following:

The simplest and most common approach is to serve the beverage at high temperatures, of the order of 70-85 C. This automatically ensures that the drink stays at an elevated temperature for a longer period of time. However, excessively high serving temperatures may cause a safety hazard, and the drink must be taken with extreme care (with proper "sipping" technique) to prevent any thermal/burn related injury.

A second method used today is to serve the beverage in a well insulated mug/cup (e.g. "Bistro" cups by Bodum, Inc.). These comprise double-walled containers that use air or vacuum as the insulating medium and often incorporate an insulated lid to minimize heat loss via convection/evaporation from the upper surface of the drink. Though this approach is viable, the increased bulk of insulated mugs make them unappealing or unacceptable in many settings.

Another technology comprises a mug/cup that incorporates an electric heater (e.g. "Mr.Coffee Mug Warmer" by Newell Brands). This heater is powered by an external source which is used to maintain the temperature of the drink at an acceptable value as long as necessary. Unfortunately, this use of external power source is a drawback in many circumstances since the mug must be connected to (or placed on) the external power source to obtain the heating function. Such mugs are also difficult to wash/clean, particularly if mechanical power connectors are used. Non-contact power transfer mechanisms such as those used in induction heaters can overcome this problem, but their increased complexity, size, weight and cost make them unsuitable in most cases.

In order to overcome the problem associated with externally powered heaters, battery packs are incorporated within the mug structure in a newer approach (e.g. "Cauldryn Coffee" mug by Cauldryn/Number 6 Brands). However, the heating duration of mugs/cups using this technology is limited by the capacity of the battery pack which also affects the size and weight of the mug adversely. The recharging time for the battery pack which can be of the order of 1-2 hours is another issue since the mug cannot be used during the recharging period. As a result, this cups/mugs have only found limited acceptance.

In an entirely different method, the mug/cup structure incorporates a phase change material with a solidification temperature corresponding to the preferred temperature of the hot drink (see McDermott, U.S. Pat. No. 5,611,328 (1997) for an example with food heating). The mug is heated prior to use in order to melt the phase change material and the additional energy stored by the phase change material (i.e. the latent heat) is used to maintain higher temperatures for longer periods of time. Unfortunately, since the latent heat of phase change materials with solidification temperatures that are well suited for this application are relatively low, the actual benefits by using such materials are quite limited. As a result, thick-walled, heavy-duty mugs with high (sensible) heat capacities are often used instead.

The different methods for hot beverage temperature control all have their advantages and limitations as summarized above. Thus, combinations of the above are also used, e.g. insulated mugs incorporating an electric heater and encapsulated phase change materials are commercially available (e.g. "Ember Travel mug" by Ember Technologies, Inc.). However, the problem has not yet been solved satisfactorily from a user perspective, and alternative methods for maintaining hot beverages at their ideal temperatures are required.

SUMMARY OF THE INVENTION

The object of this invention is to provide a completely new method for supplying heat to a beverage over an extended period of time. The invention achieves this by utilizing one or more compact heating blocks that can be added to a drink to maintain it at a high temperature (like ice cubes for cold drinks). Each heating block comprises an electrical energy storage module and heating and non-contact power receiving and recharging circuits that are encapsulated together to permit total immersion in a hot drink. A separate charging system is then used to charge/recharge the heating block(s) in a non-contact manner after each use (and cleaning/washing).

DETAILED DESCRIPTION

Figure 1:
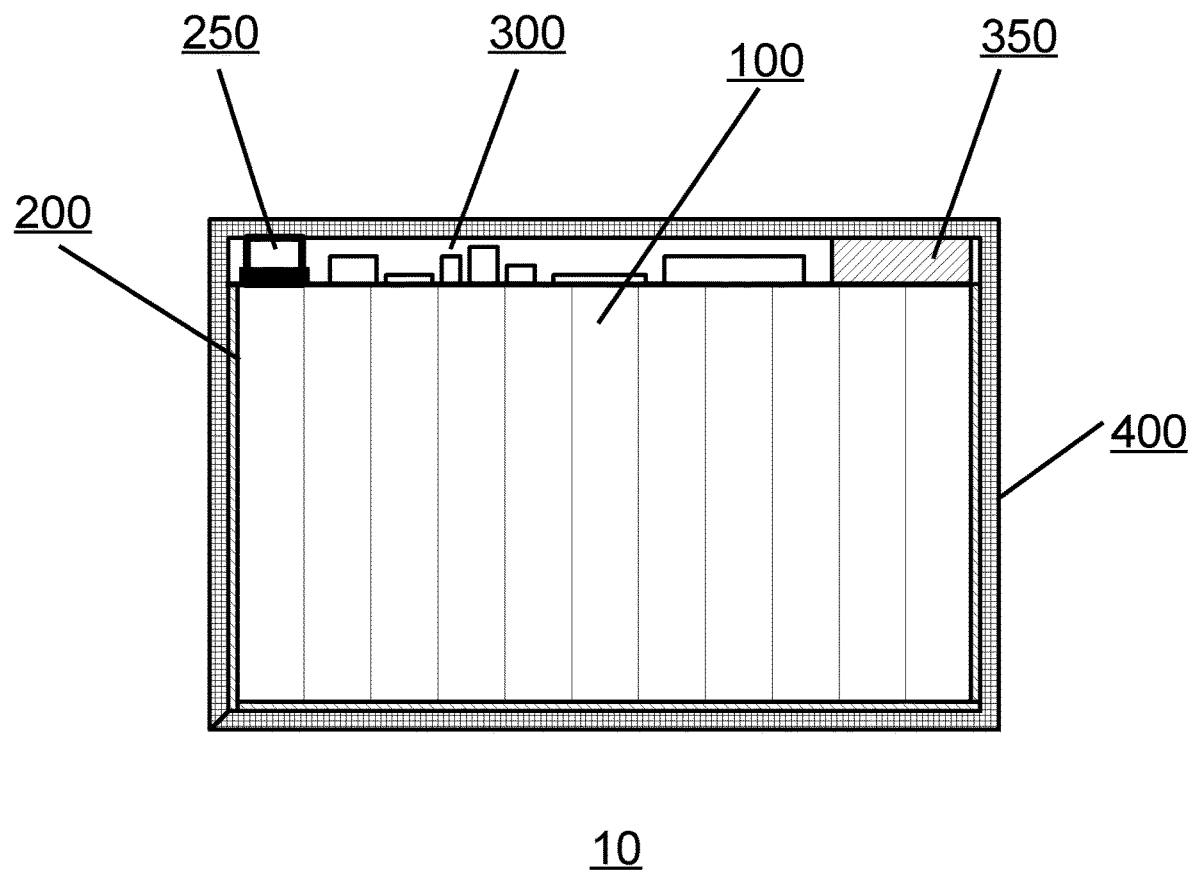
FIG. 1 is a schematic sectional diagram of a heating block per this invention.

FIG. 1 is a schematic sectional view of a preferred embodiment of a heating block (10) that provides the temperature maintenance function of this invention. It comprises a rechargeable battery pack (100) that functions as a energy storage module, a resistive heating element (200) connected to the battery pack (100) via a switch (250) and a non-contact power receiving and recharging circuit (300) that is used to charge the battery pack (100) using an external/separate non-contact recharger (not shown). All are sealed in a liquid-proof ("hot-drink-proof") encapsulant (400).

In the preferred embodiment, the battery pack (100) comprises multiple high temperature lithium ion cells. The resistive heating element (200) comprises a positive temperature coefficient (PTC) heater(s) positioned to be next to the inner surface of the encapsulant (400). A PTC heater is used since it both self-limiting and self-regulating, i.e. its set-point (~maximum) temperature is determined by its design and no additional external temperature regulating electronics are necessary. In this case, it is designed to operate at a temperature of ~80 C with a corresponding heat dissipation/power output of ~20 W. The heater is connected to the battery pack via a switch (250) which is also positioned next to the encapsulant (400) so that it may be activated mechanically by applying an external force.

The switch (250) in the preferred embodiment is of a double-throw type, and is used to connect the battery pack (100) to the heater (200) or the recharging circuit (300) as necessary. The power receiving and recharging circuit (300) comprises an inductive power receiver (350) and control circuitry to recharge the individual cells/battery pack safely and efficiently while maximizing its life. Power transfer from the external/separate charger is accomplished wirelessly in a non-contact mode without the use of any mechanical power connectors between the circuit and the charger. The power receiver (350) is placed next to the encapsulant (400) to ensure efficient power transfer. Silicone rubber is used as the encapsulant since it has very good chemical and high temperature resistance (~200 C and higher). In addition, it is extremely inert, skin-safe and is available in food-grade formulations (platinum-cured silicones) that are well-suited for culinary applications.

The battery pack (100) has a total energy storage capacity of ~25 kJ in the preferred embodiment. Food-grade silicone rubber is molded over the battery pack (100) together with the other components such that the overall volume of a heating block (10) is of the order of 5 cm×5 cm×3.75 cm (or about 2"×2"×1.5"). The wall thickness of the silicone rubber encapsulant (400) is ~0.75-1 mm so that a heating block (10) has adequate mechanical strength and long-term durability. When the PTC heater/heating block is operational and at its design/set-point temperature, this thickness also ensures that the external temperature (i.e. at the outer surface of the silicone rubber) of the heater block (10) will be ~65 C.

The volumetric energy storage density of the heating block (10), i.e. the ratio of the energy storage capacity of the battery pack to the overall volume of the heater block (10), in the preferred embodiment is ~$2.7 \times 10^8$ J/m$^3$, which takes into account multiple factors including cost, manufacturing and materials issues, etc. This is a critical parameter, which in general must be of the order of $1.5 \times 10^8$ J/m$^3$ or higher in this invention so that adequate energy can be provided to a typical mug/cup containing a hot drink over an extended period of time.

It is important to note that the set-point/operating temperature of the heater is not a critical factor by itself. Of greater importance is the external surface temperature of the heating block which depends not only on the heater temperature, but also the thermal resistance between the heater and the exterior surface (and the external conditions). In general, this temperature must be less than ~80-85 C for the present application to ensure that the heater block will not be a safety hazard. Thus, the heating block is has a surface temperature that does not exceed ~80-85 C temperature in the worst-case scenario.

In contrast to the external surface temperature, there is greater flexibility in designing for the heat transfer rate from an individual heating block since the size of the heating blocks can be varied and more heating blocks can be added to the mug if necessary. However, heating blocks with power outputs of less than ~5 W will not be useful for this application since too many heating blocks will be required to provide adequate performance when this is the case.

Figure 2:
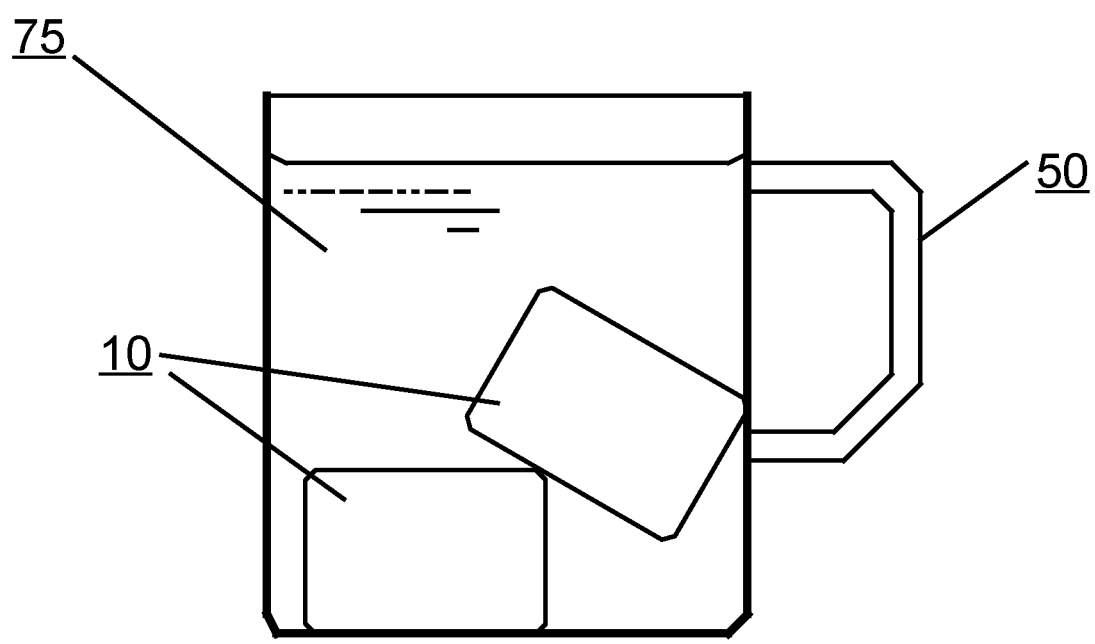
FIG. 2 shows heating block(s) being used for temperature control of a hot beverage.

During use (see FIG. 2), one or more heater blocks (10) are placed in a typical mug/cup (50) and the heater is activated by applying pressure on the switch through the encapsulant. The beverage (75) is then poured into the mug (50) and the heater now maintains the contents at the preferred temperature for extended periods. The heater blocks (10) here are comparable to ice-cubes or encapsulated ice cube substitutes that are used to maintain cold temperatures in cold-drinks (and need not be completely immersed). As with ice cubes where heat is absorbed at approximately 0 C (the melting temperature of ice), the PTC resistor ensures that heat is supplied at an approximately constant temperature. Also, like ice cubes, one or more heater blocks (10) may be added (or removed and exchanged) as the initial blocks discharge. Discharged (or partially discharged) blocks (10) can be washed/cleaned and recharged in its charging station to complete the entire cycle.

Detailed designs and manufacturing processes related to each of the separate components of the invention, viz. the battery pack, the resistor, the charging and control circuits, the encapsulation and the charging station/mechanisms are not discussed here since these are used in various forms in a wide range of applications. However, it is important to note its many advantages due to its unique features:

- The invention provides heating function for hot drinks in a simple manner that is similar to the use of ice cubes (or encapsulated ice cube substitutes) in cold drinks. Thus standard cups/mugs can be used and all the problems associated with specially designed mugs are eliminated. Its electrical heating block configuration is quite novel as similar blocks have not been considered in any existing product even though "cooling blocks" are widely available.
- The total heating capacity and duration of heating can be varied by changing the number of blocks, or by adding additional blocks, as necessary. This makes the invention much more versatile than mugs incorporating phase change materials and/or rechargeable batteries. At the same time, this invention is unique in its critical parameter definition, viz. the energy storage capacity of a block must be greater than or equal to about $1.5 \times 10^8$ J/m$^3$. In theory, numerous variables are important for any temperature control/energy storage system—the properties of the fluid (e.g. density, viscosity, thermal conductivity, specific heat capacity), the fluid flow parameters, the thermophysical properties of the mug/cup (e.g. thermal conductivity, density, specific heat capacity), the thermophysical properties of the heating blocks (e.g. density, specific heat capacity, specific energy storage capacity, thermal conductivity): in this invention however, these variables are reduced to the critical parameter above based on a careful analysis and a series of tests with various configurations.

Heat is added at an approximately constant temperature corresponding to the temperature of the PTC heater. This ensures greater enjoyment of the hot drink since not only is the temperature maintained at a preferred value/range (note that the heat transfer rate and temperature of the drink can be adjusted by stirring to vary the heat transfer coefficient), but the adverse effects of excessive temperatures and/or repeated heating are eliminated.

This invention uses an electrical energy storage method that provides greater energy storage capacity than thermal energy storage materials suitable for use with hot drinks. Thus, this invention can provide better heating performance than comparable thermal energy storage blocks.

Once charged, the heating blocks can be stored at room temperatures. As a result, these may be used in remote areas when required. This is not possible with thermal energy storage materials which must be stored at temperatures greater than its melting point prior to use.

The heating block comprises an energy storage unit that is separate from the mug/cup in this invention. This lowers its manufacturing costs and makes it easier to recycle. At the same time, improved battery/electrical energy storage, heating and related technologies can be more easily implemented within the scope of this invention to enhance the thermal performance in the future.

The invention implements a completely sealed approach for the heat blocks since electromagnetic energy/power transfer is accomplished via non-contact means through the silicone rubber walls of the blocks, i.e. no mechanical connectors are used between the charger and heat blocks for energy transfer. This provides a combination of (a) compatibility with liquid drinks (b) long life and (c) easy manufacturability.

Figure 3:
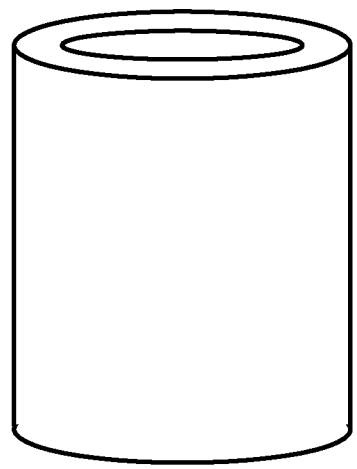
FIG. 3 shows some alternative configurations for the heating block.
Figure 3:

The present invention is not limited to the above described embodiments, and different variations and modifications that may be evident to one skilled in the art are possible without departing from its overall scope. For example, specific features that will enhance manufacturability (e.g. vacuum assisted molding of the encapsulant, the use of more than one heater element in a heating block, etc.) can and will be incorporated into the above embodiment to ensure that it can be manufactured at a reasonable cost. Some other variations of the above configuration include the following:

a. Lithium ion batteries and PTC heaters are used in the preferred embodiment due to the maturity of these technologies. Alternative electrical energy storage means/modules (e.g. nickel metal hydride batteries or other electrochemical energy storage devices/modules) and heaters (such as varistors) may be used as long as the primary criteria (volumetric energy storage capacity of heating block ~$1.5 \times 10^8$ J/m$^3$ or greater and a maximum external temperature below ~80-85 C) are met.

b. The set-point/design temperature of the heating blocks can be limited when PTC heater(s) are used. Thus, alternative heater types (e.g. flexible resistive heaters) may be preferred in some applications. In this case, a temperature sensor may be used together with a appropriate control circuit to constrain the heater temperatures and/or provide more accurate temperature control. Note that the overall volumetric energy storage capacity criteria must still be met by the heating block.

c. More elaborate heating blocks with wireless control over temperature, heating cycles, power on-off, etc. are possible by incorporating appropriate RF/other wireless communication and power control circuits within the block (the temperature control circuit can be "off-block" in this case). Though such designs will be more complex and expensive, they may be useful for specialty applications.

d. For large mugs/cups, it may be necessary to exchange heater blocks from a drink when the energy stored has been utilized. To aid with this, the heater blocks can include an extension feature (e.g. an elongated loop) that will allow it to be readily removed from a drink if necessary.

e. A more specialized version of the invention can utilize a rapid charging technology. This will result in higher initial cost of the heat block (per unit) and charger. However, overall costs may be lower in the long run since the cycle time and the number of units needed (in a high usage setting, e.g. restaurants) may be reduced.

f. Alternative charging methods are also feasible in different designs. A number of different non-contact/wireless power transfer technologies (i.e. methods for transferring electromagnetic energy without mechanical contacts) have been developed/or are under development for various applications. These may be used instead of inductive coupling for non-contact charging of the heating blocks.

g. Alternative materials may be used to encapsulate the heating blocks instead of silicone rubber. Some options here include glass, glass ceramics, metals, etc. as long as these are compatible with food/drinks that are meant for human consumption. An inert gas such as nitrogen may also be incorporated within the packaging to enhance safety and life of the heating block. These design modifications may provide longer life, though the manufacturing costs will likely be higher.

h. The structural design of the heating block may also be different. For example, instead of a single silicone rubber molding, the encapsulant may comprise multiple layers to provide manufacturing flexibility and additional mechanical stability. Such a design may comprise a primary hermetically sealed package which is over-molded with food-grade silicone rubber (or other food-grade material). This approach may make it possible to incorporate moisture absorbers/indicators in the package (e.g. between the layers) to permit leak detection and enhance safety of the heating block. Coatings (e.g. Parylene) may also be used internally/externally to increase the life of the heating block.

i. Instead of a cube type configuration, alternative geometries can be used for the heating blocks in order to enhance heat transfer rates, manufacturability, etc. FIG. 3 shows two such examples that include (i) an annulus, where the heater(s) is positioned at the inner/outer surfaces of the annulus to increase the heat dissipation area and (ii) a configuration where the (encapsulated) heater (200) is "stretched out" and placed away from the energy storage/electronic components/circuits so that heat is dissipated from both its sides.

j. It is possible to use the invention for temperature control and/or heating of other liquid, suspension or slurry-type food substances/items such as soups, broths, curries, etc. Though the minimum volumetric storage density will remain similar to that required for beverage heating, the maximum temperature for the heater block in such an application may be higher, to as much as ~120 C (the preferred heat dissipation will also likely be higher compared to the beverage temperature control application (greater than ~5-10 W)). Thus, high temperature electronic components may be required in this design.

k. It is also possible to develop different versions of the invention for more general consumer, commercial and industrial applications. Such applications may involve larger volumes of liquids or slurries/suspensions, etc. In these cases, the size and temperature constraints may be different (e.g. for an application with a variable temperature operation option), but the volumetric energy storage criteria will likely remain similar. A magnet may also be incorporated with the block so that it can be used as part of a heating/magnetic stirring system.

What is claimed is:

1. A heating block for maintaining the temperature of a hot beverage in a container utilizing energy from an external energy source,
    said heating block comprising a leak-proof enclosure encapsulating a battery pack, resistive heater, switch and a power receiving and recharging circuit in electrical connection with each other,
    said leak-proof enclosure comprising a food-grade silicone rubber encapsulant with a total external volume and having a maximum external surface temperature,
    said battery pack having an electrical energy storage capacity and comprising one of nickel-metal-hydride battery cells or lithium-ion battery cells,
    said resistive heater comprising a positive temperature coefficient resistance element and a power output that is greater than or equal to 5 W when powered by said battery pack,
    said switch positioned to allow manual operation through said silicone rubber encapsulant,
    said power receiving and recharging circuit comprising control circuitry and a power receiver configured to receive electromagnetic energy through non-contact means from said external energy source and charge said battery pack,
    wherein the ratio of said electrical energy storage capacity to said total external volume is greater than or equal to $1.5 \times 10^8$ J/m$^3$, and
    wherein said maximum external surface temperature is less than or equal to 85 C when said heater is powered by said battery pack.

2. A heating block for controlling the temperature of a food substance in a container, utilizing energy from an external energy source,
    said heating block comprising a leak-proof enclosure encapsulating an electrical energy storage module, electric heater, switch and a power receiving and recharging circuit in electrical connection with each other,
    said leak-proof enclosure comprising a food-grade encapsulant with a total external volume and having a maximum external surface temperature,
    said electrical energy storage module having an electrical energy storage capacity,
    said electric heater having a power output that is greater than or equal to 5 W when powered by said electrical energy storage module,
    said power receiving and recharging circuit comprising control circuitry and a power receiver configured to receive electromagnetic energy through non-contact means from said external energy source and charge said electrical energy storage module,
    wherein the ratio of said electrical energy storage capacity to said total external volume is greater than or equal to $1.5 \times 10^8$ J/m$^3$, and
    wherein said maximum external surface temperature is less than or equal to 120 C when said heater is powered by said battery pack.

3. The heating block of claim 2, wherein said food substance comprises a liquid drink, a suspension or a slurry-type food item.

4. The heating block of claim 2, wherein said electrical energy storage module comprises one of lithium ion battery cells, nickel metal hydride battery cells or other electrochemical energy storage device.

5. The heating block of claim 2, wherein said switch may be operated manually or remotely through wireless means.

6. The heating block of claim 2, wherein said leak-proof enclosure comprises power management circuitry and said power output may be controlled remotely through wireless means.

7. The heating block of claim 2, wherein said leak-proof enclosure comprises a temperature sensor providing temperature data and said switch may be controlled using said temperature data from said temperature sensor.

8. The heating block of claim 2, wherein said food-grade encapsulant comprises one of food-grade silicone rubber molding, ceramic, glass-ceramic, glass or metal.

9. The heating block of claim 2, wherein said food-grade encapsulant comprises of multiple layers of encapsulating materials with the outermost layer comprising a food-grade material.

10. The heating block of claim 2, wherein said electric heater is a electric resistance heater.

11. A heating block for controlling the temperature of a substance in a container, utilizing energy from an external energy source,
    said substance being one of a liquid, slurry or suspension,
    said heating block comprising a leak-proof enclosure encapsulating an electrical energy storage module, a electrically powered heater, a switch and a recharging circuit in electrical connection with each other,
    said leak-proof enclosure having a total volume,
    said electrical energy storage module having an electrical energy storage capacity,
    said recharging circuit comprising control circuitry and a power receiver configured to receive electromagnetic energy through non-contact means from said external energy source and charge said electrical energy storage module,
    wherein the ratio of said electrical energy storage capacity to said total volume is greater than or equal to $1.5 \times 10^8$ J/m$^3$.

12. The heating block of claim 11, wherein said electrical energy storage module comprises one of lithium ion battery cells, nickel metal hydride battery cells or other electrochemical energy storage device.

13. The heating block of claim 11, wherein said switch may be operated manually or remotely through wireless means.

14. The heating block of claim 11, wherein said leak-proof enclosure comprises power management circuitry and said power output may be controlled remotely through wireless means.

15. The heating block of claim 11, wherein said leak-proof enclosure comprises a temperature sensor providing temperature data and said switch may be controlled using said temperature data from said temperature sensor.

16. The heating block of claim 11, wherein said electric heater is a electric resistance heater.

\* \* \* \* \*